(12) United States Patent
Jacobsson et al.

(10) Patent No.: US 7,414,443 B2
(45) Date of Patent: Aug. 19, 2008

(54) FREQUENCY MULTIPLIER

(75) Inventors: Harald Jacobsson, Västra Frölunda (SE); Thomas Lewin, Onsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 10/581,787

(22) PCT Filed: Dec. 10, 2003

(86) PCT No.: PCT/SE03/01919

§ 371 (c)(1),
(2), (4) Date: Jun. 6, 2006

(87) PCT Pub. No.: WO2005/057786

PCT Pub. Date: Jun. 23, 2005

(65) Prior Publication Data

US 2007/0159220 A1    Jul. 12, 2007

(51) Int. Cl.
*H03B 19/00* (2006.01)

(52) U.S. Cl. ...................................... 327/116; 327/119
(58) Field of Classification Search ................ 327/113, 327/114, 116, 119; 331/53; 377/47, 48
See application file for complete search history.

(56) References Cited

U.S. PATENT DOCUMENTS

| | | | |
|---|---|---|---|
| 5,321,734 A * | 6/1994 | Ogata | 377/47 |
| 5,475,322 A | 12/1995 | MacDonald | |
| 5,530,387 A * | 6/1996 | Kim | 327/119 |
| 5,548,235 A * | 8/1996 | Marbot | 327/158 |
| 5,587,673 A * | 12/1996 | MacDonald | 326/93 |
| 5,721,501 A * | 2/1998 | Toyoda et al. | 327/116 |
| 5,786,715 A | 7/1998 | Halepete | |
| 5,786,732 A * | 7/1998 | Nielson | 331/1 A |
| 6,037,812 A * | 3/2000 | Gaudet | 327/116 |
| 6,147,525 A | 11/2000 | Mitani et al. | |
| 6,150,855 A | 11/2000 | Marbot | |
| 6,229,358 B1 | 5/2001 | Boerstler et al. | |

* cited by examiner

*Primary Examiner*—N. Drew Richards
*Assistant Examiner*—Hai L. Nguyen
(74) *Attorney, Agent, or Firm*—Nixon & Vanderhye P.C.

(57) ABSTRACT

A device is provided for multiplying the pulse frequency of a pulse train signal. The device includes input means for the signal and means for accessing the signal at points with a predetermined phase difference between them. The device additionally comprises means at a first level for combining accessed signal pairs, with one and the same phase distance within all the combined pairs, the output from each first level combining means being a pulse train. The device additionally comprises combining means at a second level for combining the pulse trains from the first level, and the combining means at the first level are such that the pulses in their output pulse trains have rise flanks which always coincide with the rise flank of the first signal in the combined accessed signal pairs, and fall flanks which always coincide with the fall flanks of the second signal in said pair.

10 Claims, 6 Drawing Sheets

| S | R | $Q_{n+1}$ |
|---|---|---|
| 0 | 0 | $Q_n$ |
| 1 | 0 | 1 |
| 0 | 1 | 0 |
| 1 | 1 | irrelevant |

FREQUENCY MULTIPLIER

TECHNICAL FIELD

The present invention relates to a device for multiplying the frequency of a signal in the form of a pulse train, the device comprising input means for the signal and a plurality of access means for accessing the signal at points with a predetermined phase difference between said points.

BACKGROUND

Frequency multipliers are important building blocks in a variety of technologies, for example communication systems. A wide range of frequencies is often desired, thus creating a desire for tuneable frequency multipliers. In general, the noise characteristics of frequency multipliers get worse the wider the tuning range of the generator. Thus, trade-offs have to be made with contemporary frequency multipliers regarding tuning range and noise characteristics. In order to live up to noise specifications, it may thus be necessary to use a plurality of different frequency multipliers to cover a wide frequency band.

The present invention is directed mainly to the field of digital frequency multipliers, and thus, to solve the problems of that category of frequency multipliers. Among those problems, the following could be mentioned:

Usually, only multiplication factors in the form of $2^n$, where n is an integer, can be obtained. In solutions where factors other than $2^n$ can be obtained, a fixed width pulse is clocked in different integer values of the minimum pulse width. This results in an output frequency spectrum rich in unwanted frequency components. It also adds asymmetry and circuit complexity not suitable for higher frequencies, such as the microwave range.

Also, many suggested digital multipliers are asymmetrical with respect to the different signals, which is particularly troublesome at very high frequencies.

Many solutions are also quite complex, and add jitter. In addition, many digital multipliers use logic circuits such as XOR or OR gates to generate pulses both on rise and fall. This may result in varying curve forms in consecutive pulses in the output of the multiplier.

It should be pointed out that the phrase "frequency multiplier" in this text refers to the pulse frequency in a pulse train.

SUMMARY

In order to overcome the problems of contemporary digital frequency multipliers, a device is provided for multiplying the pulse frequency of a signal in the form of a pulse train, the device comprising input means for the signal and a plurality of access means for accessing the signal at points with a predetermined phase difference between said points.

The device additionally comprises a plurality of means at a first level for combining accessed signal pairs, there being one and the same phase distance within all the combined pairs, where the output from each first level combining means is a new pulse train.

The device also comprises combining means at a second level for combining the pulse trains from the first level into one single pulse train, and according to the invention, the combining means at the first level are such that the pulses in their output pulse trains have rise flanks which always coincide with the rise flank from the first signal in the combined accessed signal pairs, and fall flanks which always coincide with the fall flanks of the second signal in said pair.

The advantages of this design will become evident in the following detailed description.

Suitably, the phase distance within the combined signal pairs are calculated according to the formula $(360/[2*N])+180$, where N is the desired multiplication factor, N being any number, integer or non-integer, greater than 1.

Saying that a first signal is delayed by $360/([2*N])+180$ with respect to a second signal is also equivalent to saying that the second signal is delayed by $360-(360/([2*N])+180) = 180-(180/N)$ with respect to the first signal, since a phase difference of 360° is indistinguishable from a phase difference of 0°.

Also, since the first level combining means do not make any distinction between the first and the second signal in each pair, a positive and a negative phase difference of the same absolute value are equivalent.

Preferably, the combining means at the first level comprise logic circuits with an AND-function, and the combining means at the second level comprise logic circuits with an OR-function.

NON-LIMITING EXAMPLE EMBODIMENTS

Figure 1:
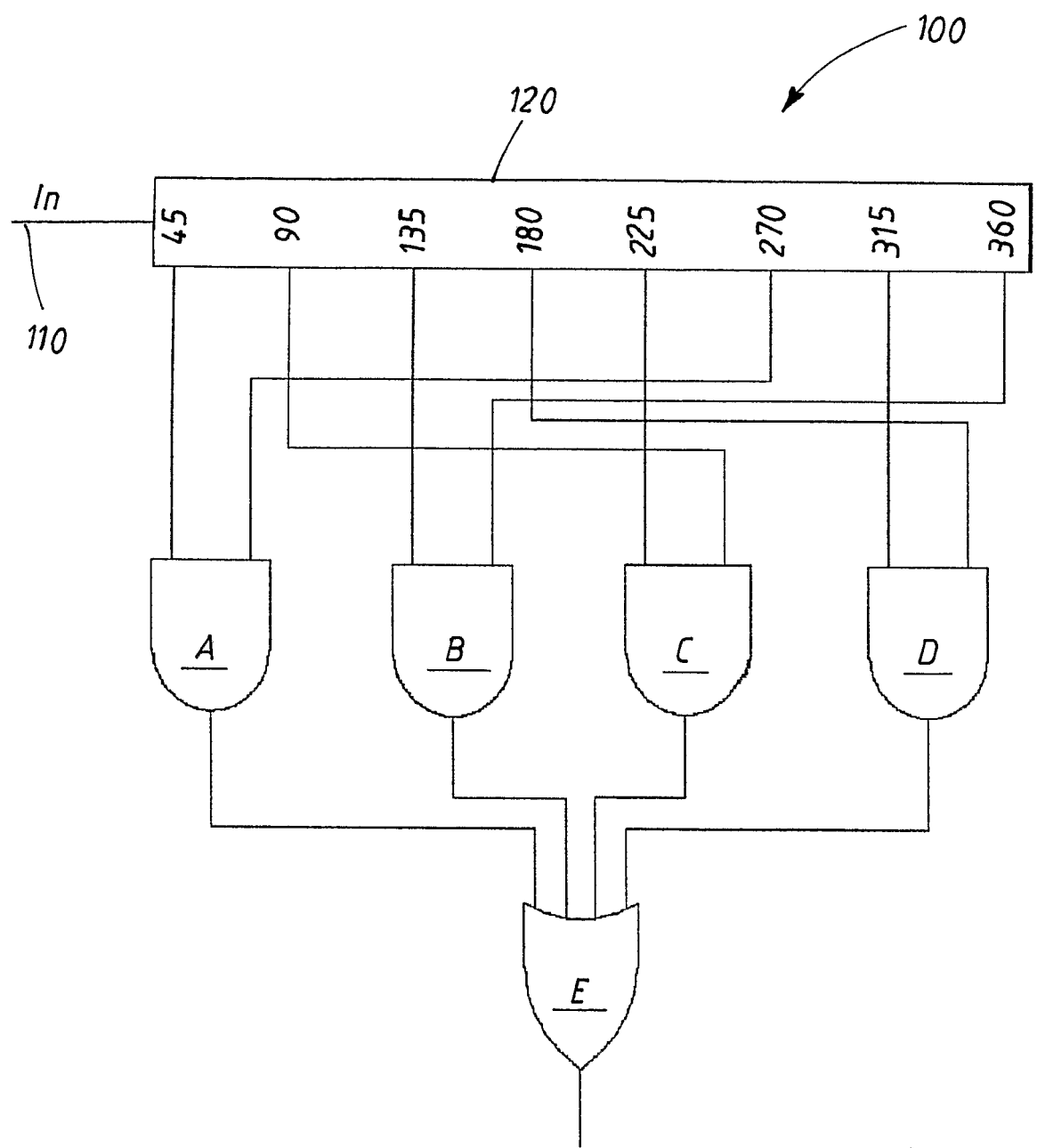
FIG. 1 shows an example embodiment which provides multiplication by four.

In FIG. 1, a first embodiment of a device 100 s shown:

An input signal, a pulse train with a basic pulse frequency $f_{in}$, is input to the input port 110 of the device. The input port inputs the signal to a component 120, preferably a delay line, which can be "tapped" or accessed at various intervals so that a plurality of signal "pairs" with equal phase separation within each pair can be obtained.

The phrase "phase separation within the pairs" refers to the fact that each pair contains a first and a second signal sample, with a phase distance between them.

A pulse train with a pulse frequency four times higher than the input pulse frequency $f_{in}$ is obtained by the device 100 in the following manner:

The phase difference within each pair is, according to the invention, calculated according to the equation $(360/[2*N]+180)$, where N is the desired multiplication factor. As will be shown later on, N can be virtually any number, integer or non-integer, greater than 1. Thus, in the case of a "multiply by four" device as in FIG. 1, the phase difference should be $360/8+180=240$ degrees, or equivalently $180-(180/N)=180-(180/8)=135$ This is also the design of the device in FIG. 1, with the input signal being accessed at the following eight points, and pair-wise input to four combining devices A, B, C, D:

A: 45−270=225
B: 135−360=225
C: 90−225=−135
D: 180−315=−135

It should be pointed out here that the phase difference in the last two pairs above, i.e. −135 degrees, fulfils the condition of the equation, since adding 360° does not change the phase difference and 360°+(−135°)=225°.

Figure 2:
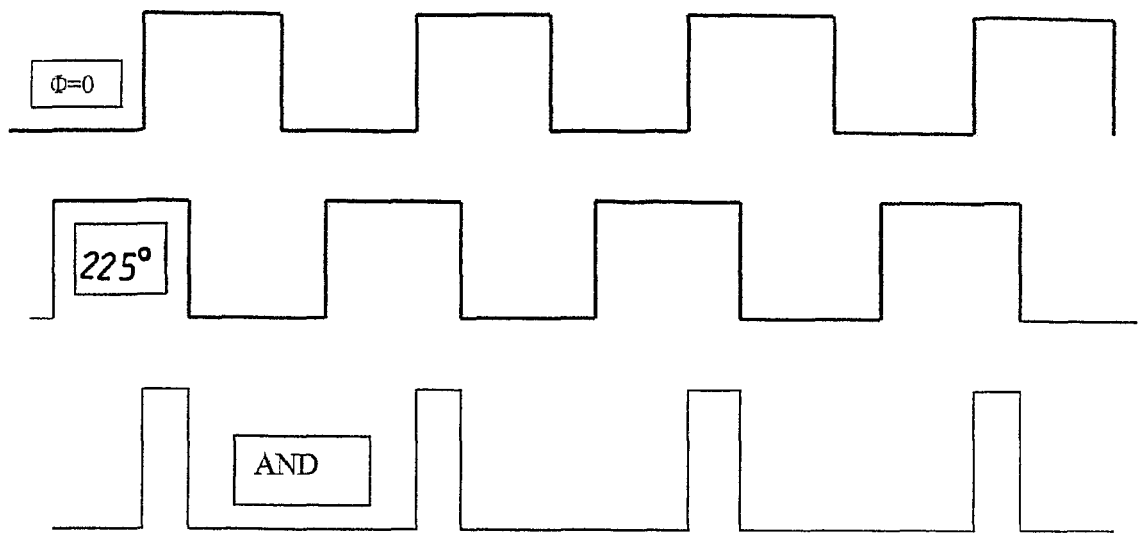
FIG. 2 shows a first combination of signals.

Turning now to FIG. 2, the combinatorial principle of the device in FIG. 1 will be shown: At the top of the figure, two pulse trains are shown, with a phase difference of 225 degrees between them, as in the pairs in the example shown in FIG. 1. Below the two pulse trains, there is shown a pulse train which is formed as the output from the combining devices shown in FIG. 1 and being comprised in the invention, the combining device having the function of an AND-gate or a circuit with a similar function, e.g. a NAND-gate and an inverter.

As can be seen from FIG. 2, the pulse train which results from the combination is a pulse train with the same pulse frequency as the input pulse train to the device, but with reduced pulse width.

Another interesting feature will also become apparent when studying the diagrams of FIG. 2. Since both of the combined signals are pulse trains (actually one and the same pulse train accessed at points with different phases), both signals comprise pulses, with the pulses having a "rise" flank and a "fall" flank. The signal which results as a combination of the two signals is also a pulse train, with the pulses having rise and fall flanks. The feature to be noted is that the rise flanks of the pulses in the combined signal all coincide with rise flanks in pulses in one and the same of the combined signals, as is also the case with the fall flanks of the pulses in the combined signal. This is beneficial due to the fact that all of the pulses in the combined signal will have identical shapes, since they are all created from identical pulse shapes (rise/fall).

In the example shown in FIG. 2, the rise flanks of the combined signal coincide with the rise flanks of the signal shown at the top, i.e. the signal with "phase zero", and the fall flanks of the combined signal coincide with the fall flanks of the second signal, i.e. the signal that is 225 degrees delayed with respect to "the zero signal".

Reverting now to FIG. 1, it is shown in this fig that the output signals from combining means are used as input to a second combining means E. Thus, the AND-function can be seen as a first level combination of signal pairs, the device also comprising a second level combination for the output signals from the first level combination.

Figure 3:
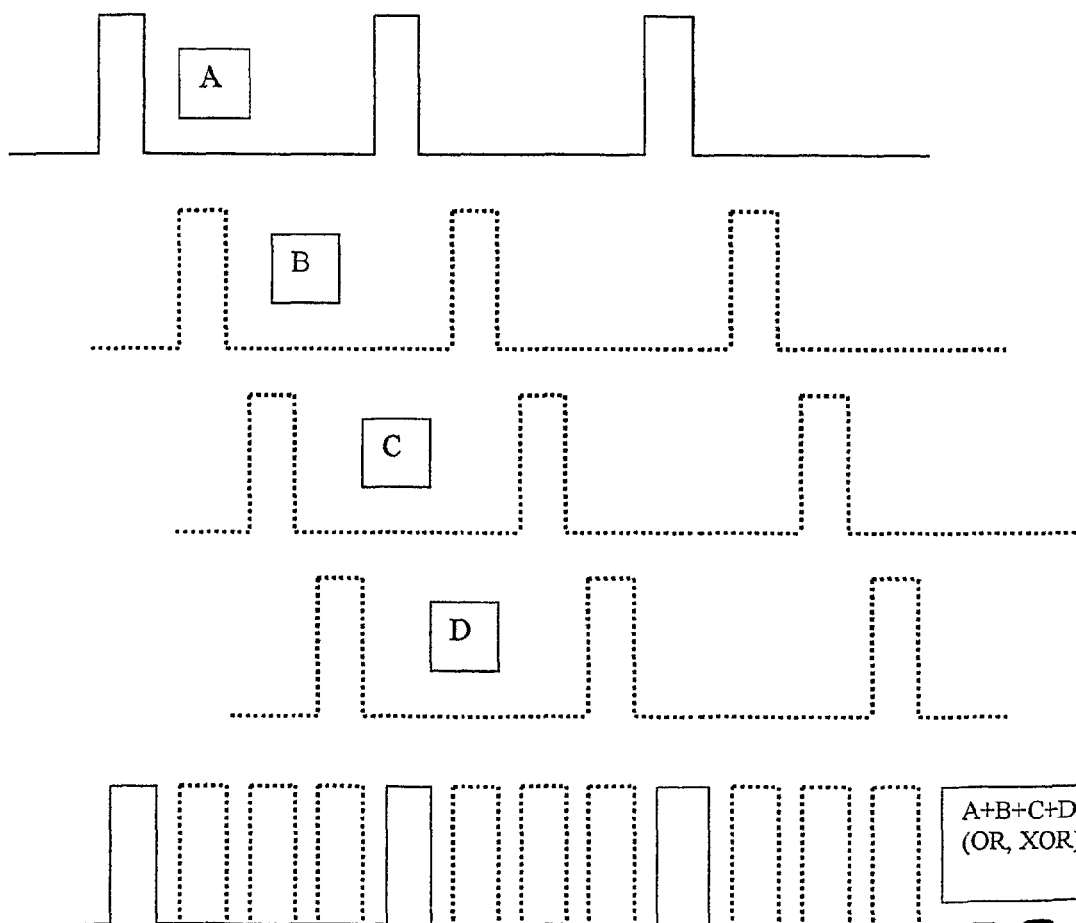
FIG. 3 shows an example embodiment with a variable multiplication factor.

The second level combination device E is a circuit with the function of an OR-gate or an XOR-gate, and the resulting output signal is shown in FIG. 3: In this fig, the output signal from each of the four first level combiners are shown, labelled A-D, and it will become apparent that these four pulse trains all have the same pulse frequency, but with the pulses appearing at different times, so that they may readily be combined into one pulse train, shown at the bottom of FIG. 3.

Naturally, the combination of four pulse trains, each with the same pulse frequency $f_{in}$ as the input pulse train, will result in a pulse train with four times that frequency, i.e. $4*f_{in}$, which was the purpose of the device shown in FIG. 1. Thus, a "times four"—frequency multiplier has been obtained.

An observation can be made here regarding the phase difference between the pulse pairs which are combined at the first level: the phase difference should be chosen so that the signals generated by the first level combining means become "equidistant" within 360 degrees, i.e. if four combiners are used, the phase difference should be 360/4=90. With reference to FIG. 1, it can be seen that the first signals are indeed 45, 135, 225, 315, thus ninety degrees between each of the first signals.

Once these phases and their order have been fixed, it is important that the second of the signals in each signal pair are shifted by the same amount in all pairs, i.e. +225°(=−135°) in all cases OR +135° (=−225°) in all cases.

Figure 4:
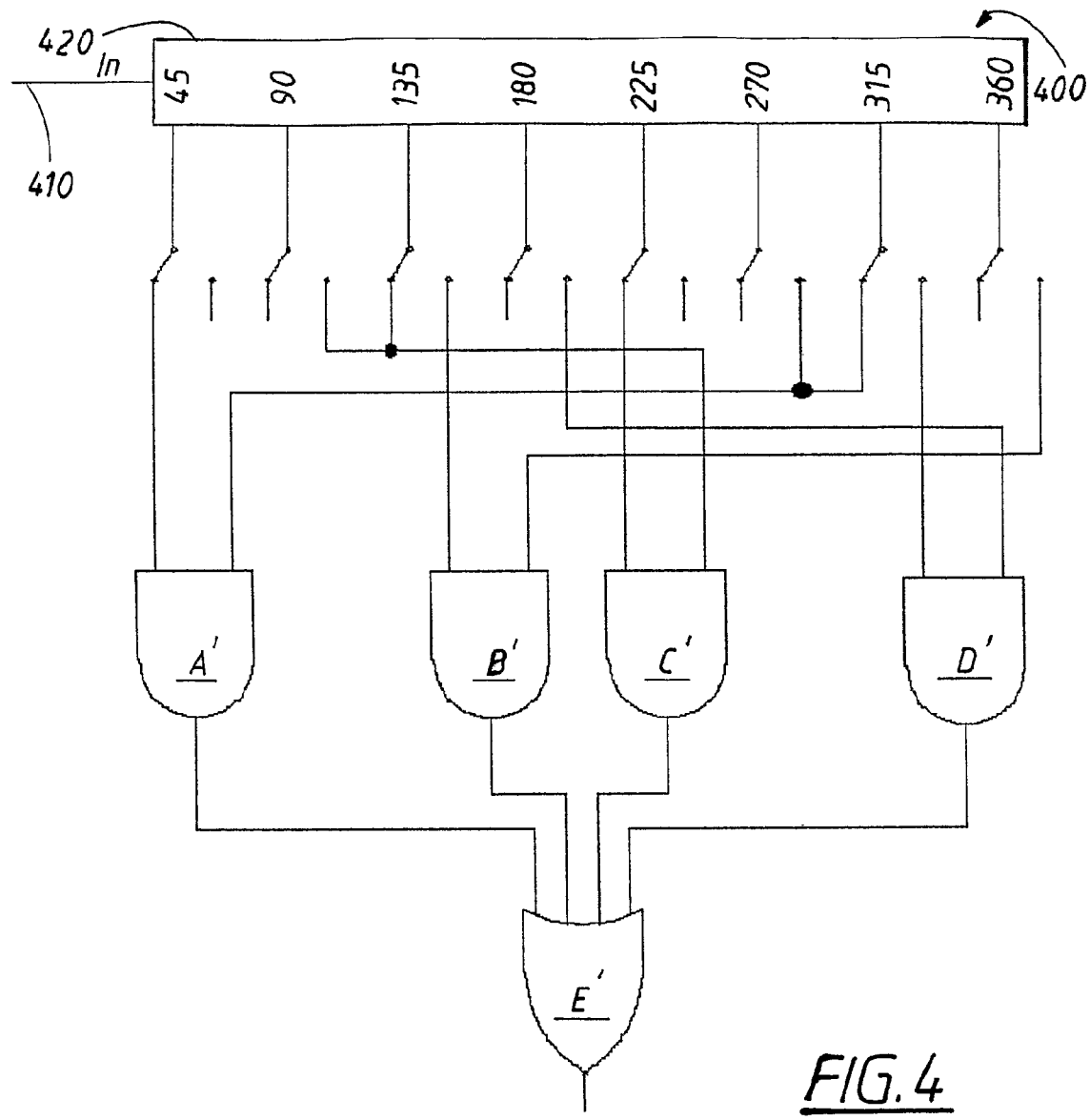
FIG. 4 includes switches in the embodiment of FIG. 1.

In FIG. 4, another example embodiment 400 is shown: the embodiment of FIG. 4 serves to illustrate that the multiplier may be used to achieve variable multiplication factors. Thus, the multiplier of FIG. 4 resembles the multiplier shown and described with reference to FIGS. 1-3, in that it also comprises a delay line 420 which can be accessed at multiple points with a chosen phase distance between said points.

The accessed signal is then fed pairwise to first level combining circuits, A', B', C', D' as with the previous embodiment, there being one and the same phase distance between the first and the second signals in the pairs, and also with one and the same phase distance between consecutive first signals in each pair.

In addition to the earlier embodiment, the device shown in FIG. 4 also comprises a set of switches, so that the second signal in each pair can be accessed from alternate points in the delay line, thus creating the possibility of altering the phase difference between the first and the second signals that are combined into pairs.

Bearing in mind the expression shown previously, i.e. (360/[2*N]+180) or (180−180/N), where N is the desired multiplication factor, it can thus be seen how the switches shown in FIG. 4 may be employed to alter the multiplication factor. If the positions shown in FIG. 4 are maintained, a "times two"-multiplier will be obtained. Reverting to the equation, a "times two"-multiplier should have a phase difference of 360/4+180=270, which is true of the circuit on FIG. 4 with the switches in the positions shown in the figure.

Thus, instead of the signal pairs shown previously, the following signal pairs will be obtained, the combiners being referred to from left to right in FIG. 4:

| Combiner | First signal phase | Second signal phase |
|---|---|---|
| A | 45 | 315 |
| B | Not used due to switch position | |
| C | 225 | 135 |
| D | Not used due to switch position | |

As can be seen, the phase differences are 45−315=−270, and 225−135=90=−270.

However, if the switches are flipped, the phase distance within the pairs will instead be as follows:

| Combiner | First signal phase | Second signal phase |
|---|---|---|
| A | 45 | 270 |
| B | 135 | 360 |
| C | 225 | 90 |
| D | 315 | 180 |

Thus, by flipping the switches, two additional combiners are enabled, resulting in four output signals (A, B, C, D), each with a phase distance between their respective first and second signals of:

A: −225
B: −225
C: 135
D: 135

As previously, −225° can be considered as equivalent to −225°+360°=135°.

Accordingly, a "multiply by four" circuit is obtained by flipping the switches to the alternate position. As with the previous embodiment in FIG. 1, the output pulse trains from the first level combiners are then combined by means of an OR-circuit or an XOR-circuit, E'

As will be realised from looking at the circuit in FIG. 4, some of the switches (45 and 225 degrees) are shown for reasons of symmetry only, and should never be switched.

Figure 5:
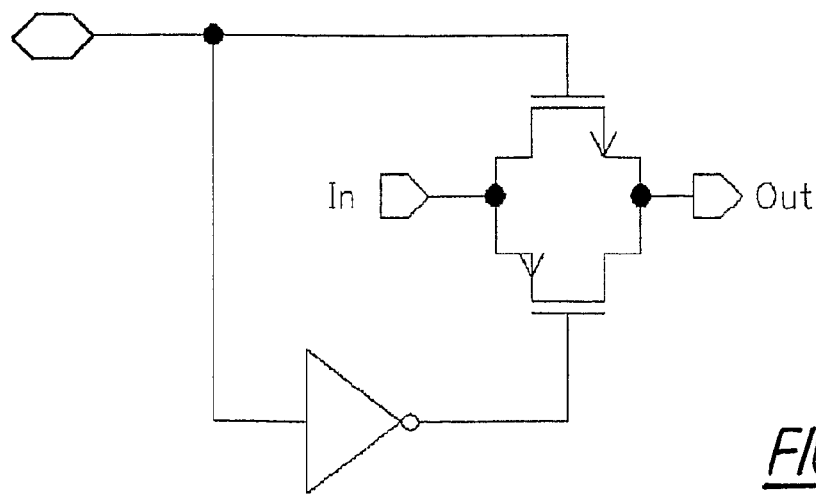
FIG. 5 shows a transmission gate switch.

The switches can be implemented in any of a number of well known and suitable ways, and will not be elaborated upon in depth here. However, for the sake of clarity, one possible switch embodiment is shown in FIG. 5, a so called transmission gate switch. As shown in FIG. 5, this kind of switch comprises a parallel connection of a PMOS-transistor and an NMOS-transistor. This kind of switch offers a symmetrical transfer function with respect to a control voltage used for operating the switch, and provides a low ON resistance and a high OFF impedance. Since switches are used, no noise or jitter is added by the device of FIG. 4.

The general principle behind the multiplier will have been realized by now. However, by way of example, it could be pointed out that a "multiply by three" circuit could be achieved by accessing a delay line at points where the signal has respective phase positions of 60°, 120°, 180°, 240°, 300° and 360°.

Using AND-circuitry, the signals are then paired as follows: 300°-60°, 60°-180°, 180°-300°, thus fulfilling the basic condition of (360/[2*N]+180), N in this case being three, thus 360/6+180=60+180=240. These pairs are then combined in an OR-circuit as shown in FIG. 1 or 4.

If the delay is split into 24 equidistant phases, the multiplier can, for example by means of switches, be set to any of the multiplication factors 2, 3, 4, 6 or 12 by properly applying the principle behind the invention when combining the phases. The principle can be applied to any multiplication factor >1, including non-integer factors, an example of which will be shown below, in connection to FIG. 6.

Figure 6:
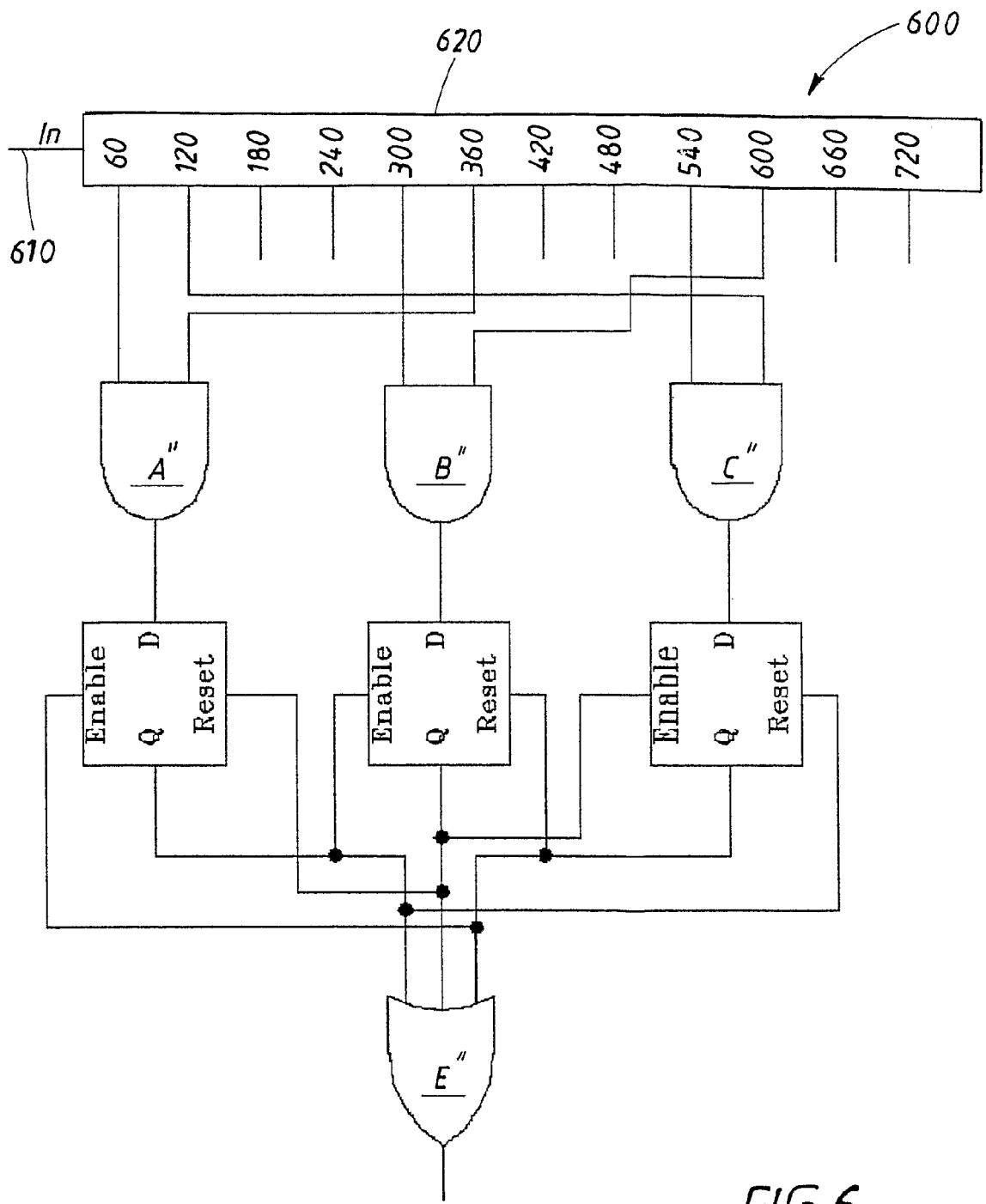
FIG. 6 shows an example embodiment which enables multiplication by non-integer factors.

In FIG. 6, a non-integer multiplier 600 is shown. In the device of FIG. 6, a "multiply-by-1.5"-circuit is obtained by combining the phases such that 3 periods of the accessed signal is realized for 2 periods of the input signal.

Suitably, the input signal is accessed at delays of up to two periods, and the accessed signal is combined pairwise using three AND-type circuits A", B", C".

As with the previously described multipliers, the multiplier 600 in FIG. 6 utilizes first level combiners, in this case AND-gates. The device 600 uses three AND-gates as first level combiners, in which the accessed input signal is combined pairwise in the following fashion:

360°-60°
600°-300°
120°-540°

As can be seen, the principle of (360/[2*N]+180), N being the desired multiplication factor is adhered to, since 360/2*1.5+180=300. (120−540=−420=2*360−420=300)

From the AND-gates, pulses of the correct width for multiplication by 1.5 are produced. However, one pulse is output from each AND-gate for each period of the input signal, thus producing twice as many pulses as desired.

To avoid having multiple pulses, two in this case, coming from a single AND-type circuit during the two periods of the input signal, the outputs from the AND-gates are gated by flip-flops before being output to the OR-gate. These flip-flops transfer the signal from D to Q only if Enable has been engaged (the signal will be transferred all the time until Reset is given, even if Enable goes low again). If Reset is engaged, the Q output is reset to zero and kept there until next Enable pulse is given. The Enable and Reset signals are provided by the Q output of the previous and next pulses in the pulse train respectively.

The outputs from the flip-flops are input to an OR-gate E" which combines the individual pulse trains from the AND-gates into a single pulse train with a pulse frequency which is 1.5 that of the pulse train input to the device.

During start-up of the device 600, or when, for example, changing multiplication factor, all flip-flops but one (e.g. the first) have to be given a reset signal to ensure stable operation. This can be provided by placing an additional OR-gate at the Reset input of all flip-flops but the first. One of the inputs to the OR-gate is as in FIG. 6, the other is the "start-up" reset signal. On the first flip-flop an extra OR-gate is placed at the Enable input where the "start-up" reset signal is given as one input making sure that the first flip-flop is open at "start-up".

Figures 7, 8:
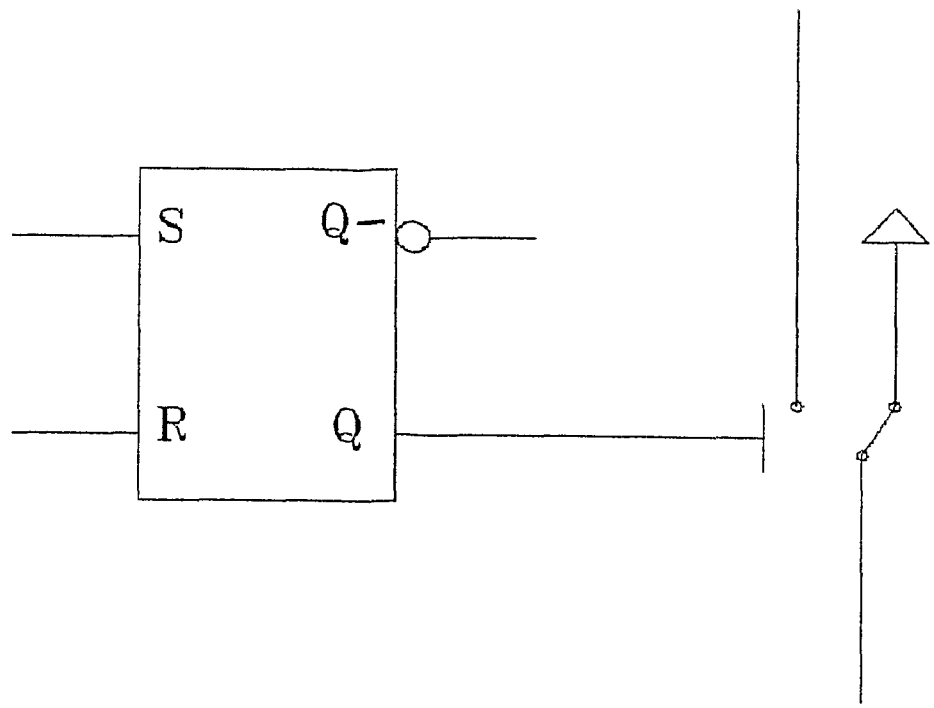
FIG. 7 shows a gated flip-flop for use in the non-integer multiplier.
FIG. 8 shows a truth table for the flip-flop in FIG. 7.

An example of how a gated flip-flop for use in the device 600 can be implemented is shown in FIG. 7. It comprises an SR-type flip-flop, which has a truth table shown in FIG. 8, and a switch.

If Enable is high, or Enable is the last SR flip-flop input that was high, the output of the SR flip-flop is high. When the SR flip-flop output is high the switch is closed and the input of the device 600, Q, is passed to the device 600 output. When Reset goes high, the output of the SR flip-flop goes low and stays low until Enable goes high again. When the SR flip-flop output goes low, the switch goes into the position where the device 600 output is grounded (goes low).

However, a two period delay as shown in FIG. 6 is not always required. For example, the 600° input can be replaced by the 600−360=240° input, as long as the sequence of Enable-Reset signals is retained. In certain cases, it could still be preferable to have a two period delay, e.g. if sequential input pulses are not identical like in a frequency modulated signal.

In addition, any ½ multiplication factor >1, i.e. 1.5, 2.5, 3.5 etc., can be achieved by proper choice of output phases utilizing a delay of two input periods, or a two period sequence of a single period delay. For a 3 period delay, or a three period sequence of a single period delay, any ⅓ multiplication factor >1, i.e. 1.33, 1.67, 2.33, 2.67 etc., can be achieved in a similar manner. For an n period delay, or an n period sequence of a single period delay, any N+M/n, where N and M are integer numbers $\geq 1$, multiplication factor and be achieved.

Figure 9:
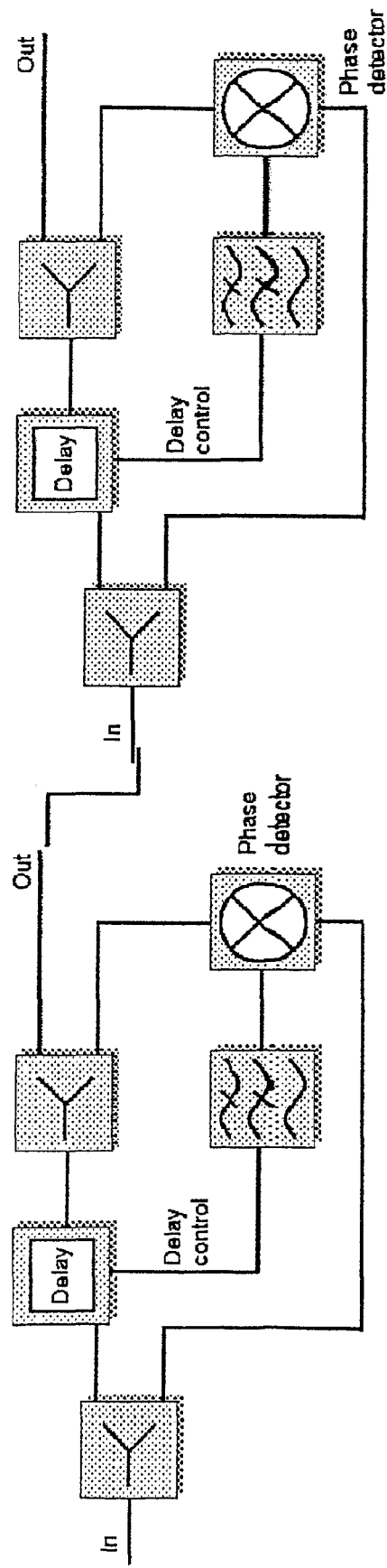
FIG. 9 shows a delay locked loop (DLL).

The n-period delay used in some embodiments can, for example be designed with the use of n so called Delay Locked Loops connected in series. An example of a suitable DLL is shown in FIG. 9. Since DLL:s as such are previously known, they will not be described in further depth here.

In addition, the delay could also be realized by comparing the phase at the output of the second delay directly with the input phase of the first delay. The delay itself could, apart from DLL:s, be of any kind, e.g. active circuits (inverters) or tunable passive delay lines. Another type of delay which could be used is a ferroelectric tunable delay line.

Thus, as has been explained and shown, with the proper choice of oscillator tuning range and devices with controllable multiplication factors, very wide range frequency generators can be realized.

As an example, consider a VCO with an operation frequency range of $f_0$ to $f_1$. Further assume that $f_1=1.4f_0$. If a multiplier with variable multiplication factors of 1.3, 1.5, 2, 2.5, 3 and 4 are connected to the VCO, the entire frequency range between $f_0$ and $4f_1=5.6f_0$ will be covered.

In conclusion, the technology offers the possibility of frequency multipliers with, for example, the following advantages:

The use of AND (or NAND) gates makes the waveform more symmetrical.

Integer multiplication factors other than $2^n$ can be achieved with low content of other frequency components Non-integer multiplication factors can be achieved with low content of other frequency components The multiplication factor can be varied by a control signal (i.e. controlling switches as shown in FIG. 4).

The signal paths can be made symmetrical.

Subsequent pulses have identical waveforms since they are generated from identical pulse "edges"

A system with one VCO and a controllable multiplier makes a very compact, flexible, wide band, general purpose frequency generator, which would be straight forward to integrate on a single chip.

The invention claimed is:

1. A device for multiplying the pulse frequency of a signal in the form of a pulse train, the device comprising:
   an input port for the signal and a plurality of access points for accessing the signal at points with a predetermined phase difference between said points;
   first circuits at a first level for combining accessed signal pairs, there being a same phase distance within all the combined pairs, the output from each first level circuit being a new pulse train;
   a second circuit at a second level for combining the pulse trains from the first level circuits into a single pulse train,
   wherein output pulse trains have rise flanks which coincide with the rise flank of the first signal in the combined accessed signal pairs, and fall flanks which coincide with the fall flanks of the second signal in said pair,
   wherein the phase distance within the combined pairs is calculated according to the formula $(360/[2*N])+180$, where N is the desired multiplication factor, N being a number greater than 1, and
   wherein the device further comprises switching circuitry connected to the input of one or several of the first level circuits for switching the input to provide the first level circuits with another phase distance within the combined signal pair according to the formula $(360/[2*N])+180$, where N is a desired multiplication factor and N is a number greater than 1.

2. The device of claim 1, wherein the switching circuitry is configured to disconnect the input signals to one or more of the first level circuits.

3. The device of claim 1, wherein the first level circuits comprise logic circuits with an AND-function.

4. The device of claim 1, wherein the second level circuit comprises a logic with an OR-function.

5. A device for multiplying the pulse frequency of a signal in the form of a pulse train, the device comprising:
   an input port for the signal and a plurality of access points for accessing the signal at points with a predetermined phase difference between said points;
   first circuits at a first level for combining accessed signal pairs, there being a same phase distance within all the combined pairs, the output from each first level logic circuit being a new pulse train;
   a second circuit at a second level for combining the pulse trains from the first level circuits into a single pulse train,
   wherein output pulse trains have rise flanks which coincide with the rise flank of the first signal in the combined accessed signal pairs, and fall flanks which coincide with the fall flanks of the second signal in said pair,
   wherein the device further comprises flip-flops between the output of the first level circuits and the inputs of the second level circuit to avoid having multiple pulses from the first level circuits during two periods of the input signal.

6. A method for multiplying the pulse frequency of a signal in the form of a pulse train comprising:
   accessing the signal at a plurality of points with a predetermined phase difference between said points;
   first level combining of the signal pairwise from said accessed signal points so that there is a same phase distance within all the combined pairs, the output from each first level combination being a new pulse train;
   combining at a second level the pulse trains from the first level into one single pulse train,
   wherein the combining at the first level is carried out so that pulses in the output pulse trains at the first level have rise flanks which coincide with the rise flank of the first signal in the combined accessed signal pairs, and fall flanks which coincide with the fall flanks of the second signal in said pair,
   wherein the phase distance within the combined pairs is calculated according to the formula $(360/[2*N])+180$, where N is the desired multiplication factor and N is an integer greater than 1, and
   wherein the method further comprises the ability to alternate the phase distance between the signals used in one or several of the combinations at the first level.

7. The method of claim 6, wherein said alternating also permits disconnecting the input signal to one or more of first level combining circuits.

8. The method of claim 6, according to which the combining at the first level comprises logic operations with an AND-function.

9. The method of claim 6, according to which the combining at the second level comprises a logic operation with an OR-function.

10. The method of claim 6, additionally comprising using flip-flops between a output of the first level and the inputs of the second level to avoid having multiple pulses, from the first level during two periods of the input signal.

* * * * *

UNITED STATES PATENT AND TRADEMARK OFFICE
CERTIFICATE OF CORRECTION

PATENT NO.         : 7,414,443 B2  
APPLICATION NO.    : 10/581787  
DATED              : August 19, 2008  
INVENTOR(S)        : Jacobsson et al.

Page 1 of 1

It is certified that error appears in the above-identified patent and that said Letters Patent is hereby corrected as shown below:

In Column 1, Line 2, insert -- This application is the US national phase of international application PCT/SE2003/001919 filed 10 December 2003, which designated the U.S., the entire contents of which are hereby incorporated by reference. --.

Signed and Sealed this

Twenty-first Day of April, 2009

JOHN DOLL  
*Acting Director of the United States Patent and Trademark Office*